(12) United States Patent
Jacobson et al.

(10) Patent No.: US 10,214,090 B1
(45) Date of Patent: Feb. 26, 2019

(54) FLYWHEEL ENERGY STORAGE IN POWER SYSTEM HAVING VARIATOR MODULATED DIFFERENTIAL GEARTRAIN

(71) Applicant: Caterpillar Inc., Peoria, IL (US)

(72) Inventors: Evan Jacobson, Edwards, IL (US); John Seipold, Peoria, IL (US); Michael Cronin, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/685,674

(22) Filed: Aug. 24, 2017

(51) Int. Cl.
*B60K 6/30* (2007.10)
*B60K 6/365* (2007.10)
*B60K 6/485* (2007.10)
*B60W 10/115* (2012.01)
*B60W 10/02* (2006.01)
*B60W 10/04* (2006.01)
*B60K 6/48* (2007.10)

(52) U.S. Cl.
CPC ............... *B60K 6/30* (2013.01); *B60K 6/365* (2013.01); *B60K 6/485* (2013.01); *B60W 10/02* (2013.01); *B60W 10/04* (2013.01); *B60W 10/115* (2013.01); *B60K 2006/4808* (2013.01)

(58) Field of Classification Search
CPC ..................................................... B60K 6/485
See application file for complete search history.

(56) References Cited

U.S. PATENT DOCUMENTS

| 4,625,823 | A | 12/1986 | Frank |
| 6,024,667 | A | 2/2000 | Krohm et al. |
| 8,142,329 | B2 | 3/2012 | Ortmann |
| 8,359,145 | B2 | 1/2013 | Bowman et al. |
| 8,398,515 | B2 | 3/2013 | Sartre et al. |
| 8,622,860 | B2 | 1/2014 | Versteyhe et al. |
| 8,708,081 | B1 | 4/2014 | Williams |
| 9,028,362 | B2 * | 5/2015 | He ............... B60K 6/105 477/3 |
| 9,108,625 | B2 | 8/2015 | Tanaka et al. |
| 9,266,521 | B2 | 2/2016 | He et al. |
| 9,327,588 | B2 | 5/2016 | Jacobson et al. |
| 9,352,738 | B2 * | 5/2016 | Kellerman ............. B60W 10/02 |
| 2012/0196713 | A1 * | 8/2012 | He ............... B60K 6/105 475/5 |
| 2012/0197472 | A1 * | 8/2012 | He ............... B60K 6/105 701/22 |

* cited by examiner

*Primary Examiner* — Derek D Knight
(74) *Attorney, Agent, or Firm* — Jonathan F. Yates

(57) ABSTRACT

A power system includes an engine, a driveshaft, and an energy storage system having a flywheel. The energy storage system further includes a transmission structured to transfer energy between the flywheel and the driveshaft. The transmission includes a differential geartrain and a variator coupled to the differential geartrain and having a variator input shaft and a variator output shaft rotatable at a range of speed ratios. The variator may be coupled to a sun gear in the differential geartrain and controls a pattern of energy transfer between the flywheel and the driveshaft.

20 Claims, 4 Drawing Sheets

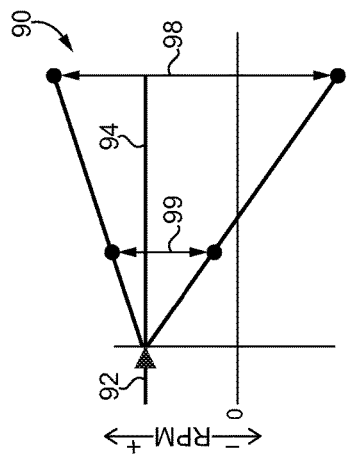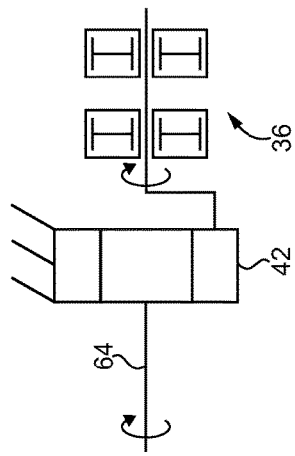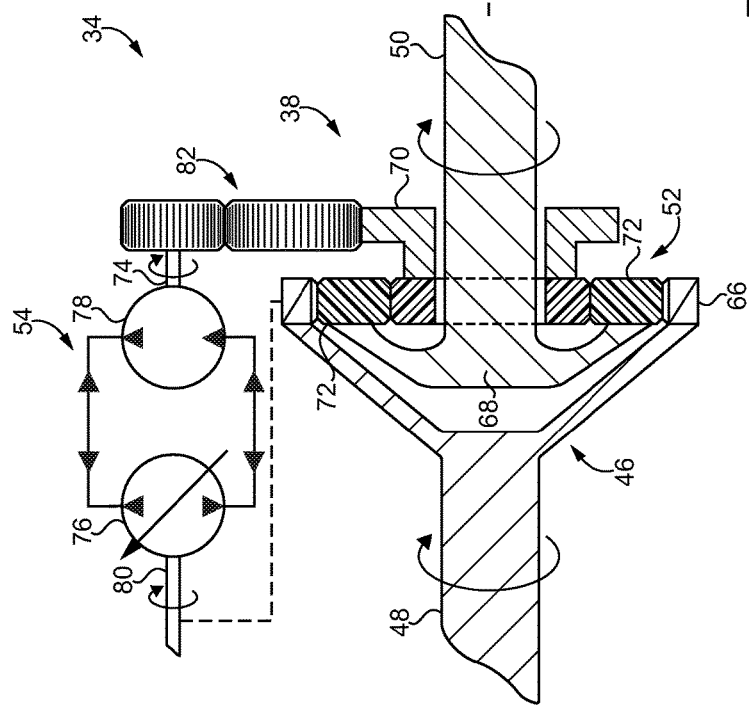
FIG. 5
FIG. 4

US 10,214,090 B1

FLYWHEEL ENERGY STORAGE IN POWER SYSTEM HAVING VARIATOR MODULATED DIFFERENTIAL GEARTRAIN

TECHNICAL FIELD

The present disclosure relates generally to a flywheel energy storage system in a machine, and more particularly to flywheel energy storage where a transmission having a differential geartrain and a variator transfers energy between a driveshaft and a flywheel.

BACKGROUND

Energy storage systems for many different machines are well known and widely used. Systems such as regenerative braking systems known from mobile vehicle applications may store energy from decelerating a vehicle that would otherwise be lost in an electrical energy storage device such as a battery or a capacitor. Hydraulic systems commonly store energy for subsequent recovery in pressure accumulators or the like. Flywheels have been used for literally centuries to store kinetic energy, and are now increasingly applied in mobile vehicle and machinery applications. A flywheel stores kinetic energy in a rotating rotor that can be sped up to store energy when extra energy is available, and slowed down to extract the stored energy when desired. High-speed flywheels, having rotational speeds in the tens of thousands of revolutions per minute, are commercially available and have been applied now with some commercial success in the automotive context.

One technical challenge relating to high-speed flywheels is the relatively great speed difference between a charged or energized flywheel and the system with which it interacts. In the case of an internal combustion engine, the engine speed may be as much as a few thousand revolutions per minute, but still potentially an order of magnitude or more less than potential speeds of the flywheel. As it is generally desirable to use a relatively small and lightweight flywheel that will rotate relatively fast, as opposed to a heavy, bulky, and slower flywheel, apparatus is typically necessary for matching the speeds of the two systems.

Since many mechanical transmission systems can have inherent structural and material limitations as to the maximum speeds and/or speed ratios within the system, multi-range transmission systems have been proposed to account for the large speed ratios in flywheel energy storage systems. Engineers have also proposed continuously variable transmission or "CVT" systems to transfer torque between a flywheel and an engine or other mechanism having a prime mover. U.S. Pat. No. 9,108,625 proposes a planetary gear device between a driving wheel and an energy accumulating device. A sun gear of the planetary gear device is connected to an input shaft of the energy accumulating device. A carrier of the planetary gear device is connected to the driving wheel. A torque adjusting device is apparently electronically controlled to vary a braking torque applied to a ring gear in the planetary to reduce a difference in rotational speeds between an input shaft and the sun gear. While the strategy in the '625 patent may have certain applications it is relatively complex, and there is ample room for improvements and other advancements in the field.

SUMMARY OF THE INVENTION

In one aspect, a power system for a machine includes a driveshaft structured for coupling between an engine and a rotatable load. The power system further includes an energy storage system having a flywheel, and a transmission structured to transfer energy between the flywheel and the driveshaft. The transmission includes a differential geartrain having a rotatable input element rotatable at a fixed speed ratio with the driveshaft, and a rotatable output element rotatable at a fixed speed ratio with the flywheel. The differential geartrain further includes at least one rotatable speed control element coupled with the rotatable input element and the rotatable output element. The transmission further includes a variator having a variator input shaft and a variator output shaft coupled to the at least one rotatable speed control element.

In another aspect, a machine includes a frame and a power system coupled to the frame. The power system includes an engine, a rotatable load, a driveshaft coupled between the engine and the rotatable load, and an energy storage system. The energy storage system includes a flywheel and a transmission. The transmission includes a differential geartrain having at least one rotatable speed control element, and is structured to transfer energy between the flywheel and the driveshaft. The transmission further includes a variator having a variator input shaft and a variator output shaft coupled with the at least one rotatable speed control element and rotatable at a range of speeds relative to the variator input shaft to vary a difference between an input speed and an output speed of the transmission.

In still another aspect, a method of operating a power system in a machine includes operating an engine in the power system so as to rotate a driveshaft extending between the engine and a rotatable load. The method further includes varying the speed of an output shaft of a variator in a transmission coupled with the engine so as to vary the speed of a rotatable speed control element in a differential geartrain of the transmission, and transferring energy between the driveshaft and an energy storage flywheel in the power system by way of the transmission. The method further includes changing a pattern of the transfer of energy between the driveshaft and the energy storage flywheel in response to the varying of the speed of the output shaft of the variator.

BRIEF DESCRIPTION OF THE DRAWINGS

FIG. 4 is a partially sectioned side diagrammatic view of an energy storage system, according to one embodiment; and FIG. 5 is a nomogram illustrating functional properties of a transmission in an energy storage system, according to one embodiment.

DETAILED DESCRIPTION

Figure 1:
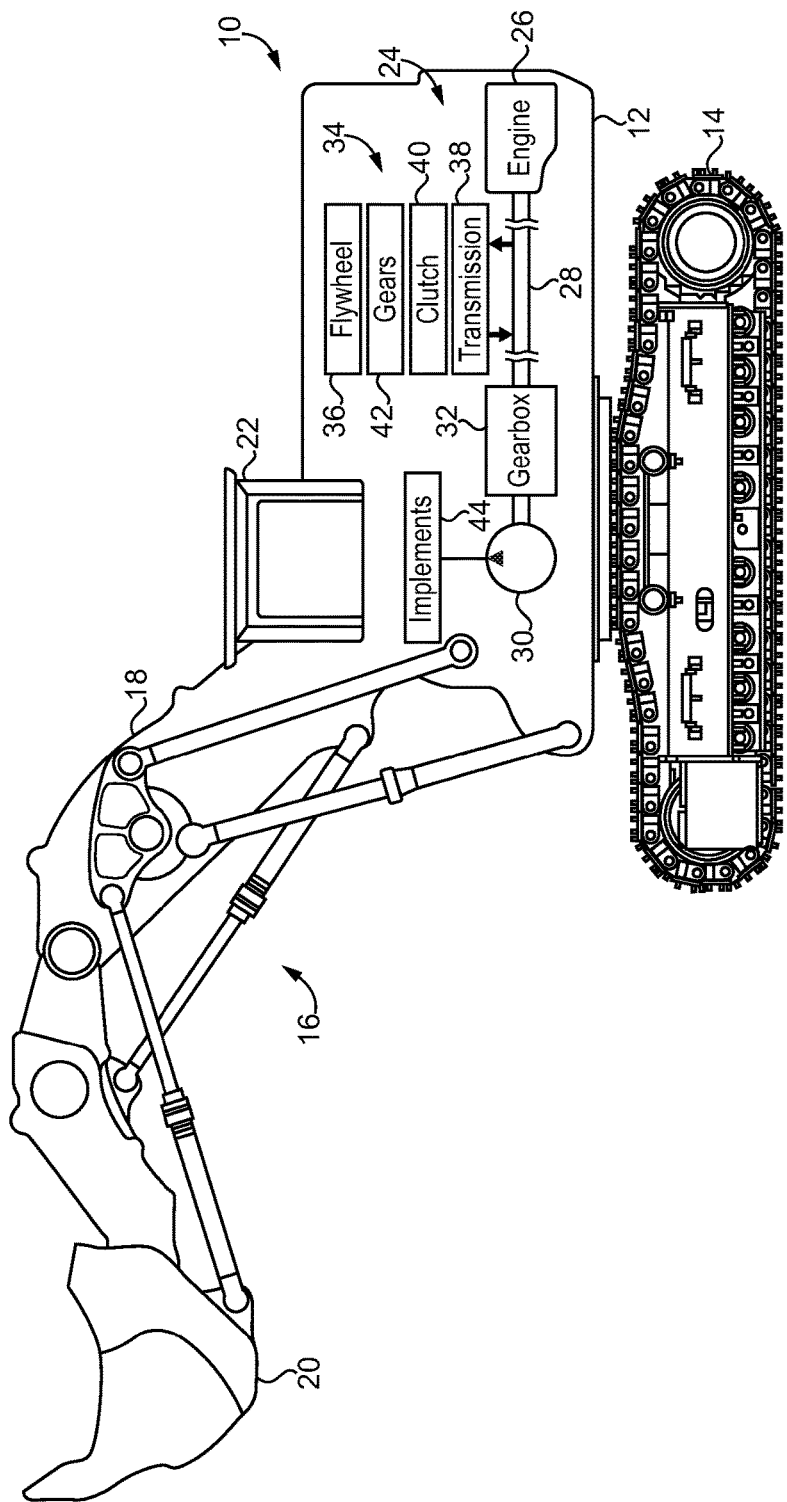
FIG. 1 is a side diagrammatic view of a machine, according to one embodiment.

Referring to FIG. 1, there is shown a machine 10 according to one embodiment, and including a frame 12 with an operator cab 22 mounted thereon, and supported upon ground-engaging propulsion elements 14. Machine 10 includes a hydraulically actuated implement system 16 having a boom 18 and a bucket 20. Machine 10 is shown in the context of a track-type machine for excavating, mining, and similar applications and known in the art as a front shovel. It should be appreciated that machine 10 might not be a track-type machine, or a machine for off-highway applications at all. In the off-highway context, machine 10 could include a tractor, a loader, a backhoe, a truck, or any of a variety of other machine types. On-highway machines such as a truck or the like could also benefit from application of the teachings set forth herein.

Machine 10 further includes a power system 24 having an engine 26, such as an internal combustion compression ignition diesel engine, a rotatable load 30, and a driveshaft 28 structured for coupling and transferring torque between engine 26 and rotatable load 30. A gearbox 32 is also coupled between driveshaft 28 and rotatable load 30. In the illustrated embodiment, rotatable load 30 includes a hydraulic pump 30 structured to provide pressurized hydraulic fluid to implement hydraulics 44. Implement hydraulics 44 can include the various valves, conduits, accumulators, controls, actuators, and other apparatus for operating hydraulically actuated implement system 16. Pump 30 could also be structured to provide hydraulic fluid to a hydraulically actuated propulsion system of machine 10, such as hydraulic motors (not shown) that drive ground-engaging elements 14. Driveshaft 28 could include a single shaft, multiple shafts coupled together by way of one or more universal joints, transfer gears, differential gears, and still other apparatus. Gearbox 32 can include speed reduction gears, for example, to transfer torque between driveshaft 28 and pump 30. Other machine loads such as additional pumps, compressors, traction drive mechanisms, and still others could also be operated by way of power system 24 with power takeoff from driveshaft 28.

It should further be appreciated that power system 24 may be structured not only to provide rotational power or torque to various components, but potentially also to receive rotational power inputs or torque from the driven components of the system. For example, hydraulically actuated implement system 16 could be structured to store energy during lowering of boom 18 in an accumulator, and then return energy for raising boom 18 as appropriate. Pump 30 could also include a hydraulic pump/motor that can be operated in a motoring mode when regenerative hydraulic pressure is available so as to rotate other components of machine 10 for energy storage purposes as further discussed herein. Pump 30 could be motored to drive a flywheel, for example. Moreover, a propulsion system of machine 10 could be structured to recover energy of braking machine 10 and store the regenerative energy as kinetic energy, fluid pressure, or electrical or chemical energy according to a variety of strategies.

Power system 24 further includes an energy storage system 34 that is structured to receive energy from, and return energy to, driveshaft 28. When engine 26 is operated with excess output power some or substantially all of the output power produced by engine 26 at least for a time can be stored in energy storage system 34. When extra energy above an output of engine 26 is desired, the stored energy in energy storage system 34 can be returned to driveshaft 28, or to other systems. This general strategy can enable engine 26 to operate at a substantially constant speed and/or smoothly manage transients, assisting in optimizing efficiency and exhaust emissions among other advantages. Energy storage system 34 includes a transmission 38 coupled with driveshaft 28, and a flywheel 36, or a plurality of flywheels such as a plurality of flywheels arranged in parallel, in series, or parallel series stacks of flywheels. Energy storage system 34 also includes a speed-up and/or reduction geartrain(s) or gears 42, and a clutch 40 coupled between flywheel 36 and transmission 38. As will be further apparent from the following description, machine 10, power system 24, and other machine and power system embodiments contemplated herein, are uniquely configured for efficient transfer of energy between driveshaft 28 and flywheel 36 in an apparatus having a single range.

Figure 2:
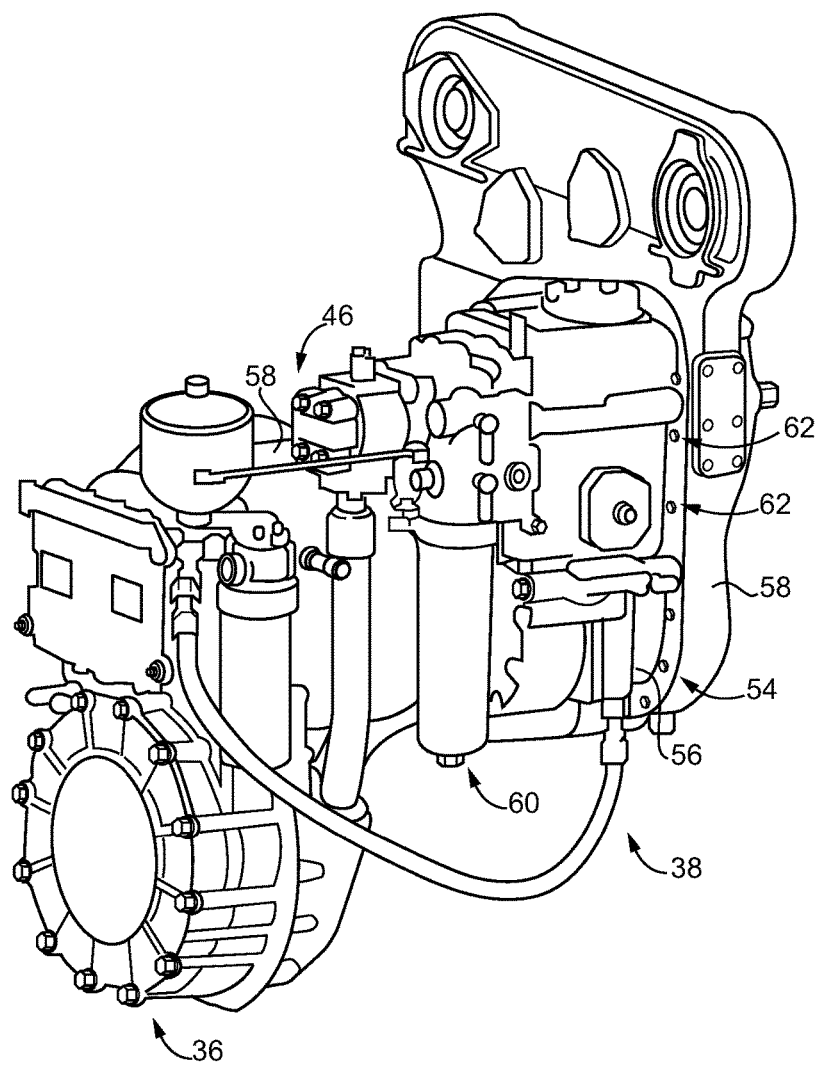
FIG. 2 is a diagrammatic view of a transmission suitable for use in the machine of FIG. 1.

Referring also now to FIG. 2, there are shown parts of energy storage system 34 including flywheel 36 shown as a flywheel module, and additional components of transmission 38 including a differential geartrain 46 not visible in FIG. 2 but positioned within a transmission housing 58. Also shown in FIG. 2 is a variator 54 positioned within a variator housing 56. Variator 54 may include a hydraulic variator, and in the FIG. 2 depiction variator housing 56 is mounted upon transmission housing 58 by way of a plurality of bolted connections 62. Variator fluid components 60 are also shown coupled to one or both of transmission housing 58 and variator housing 56. Variator fluid components can include filters, coolers, a charge pump, conduits, and a variety of other known components used in connection with hydraulic variators. It is contemplated that positioning variator housing 56 and other components externally to transmission housing 58 enables these serviceable components and systems to be easily and readily accessed for service and diagnostics.

Figure 3:
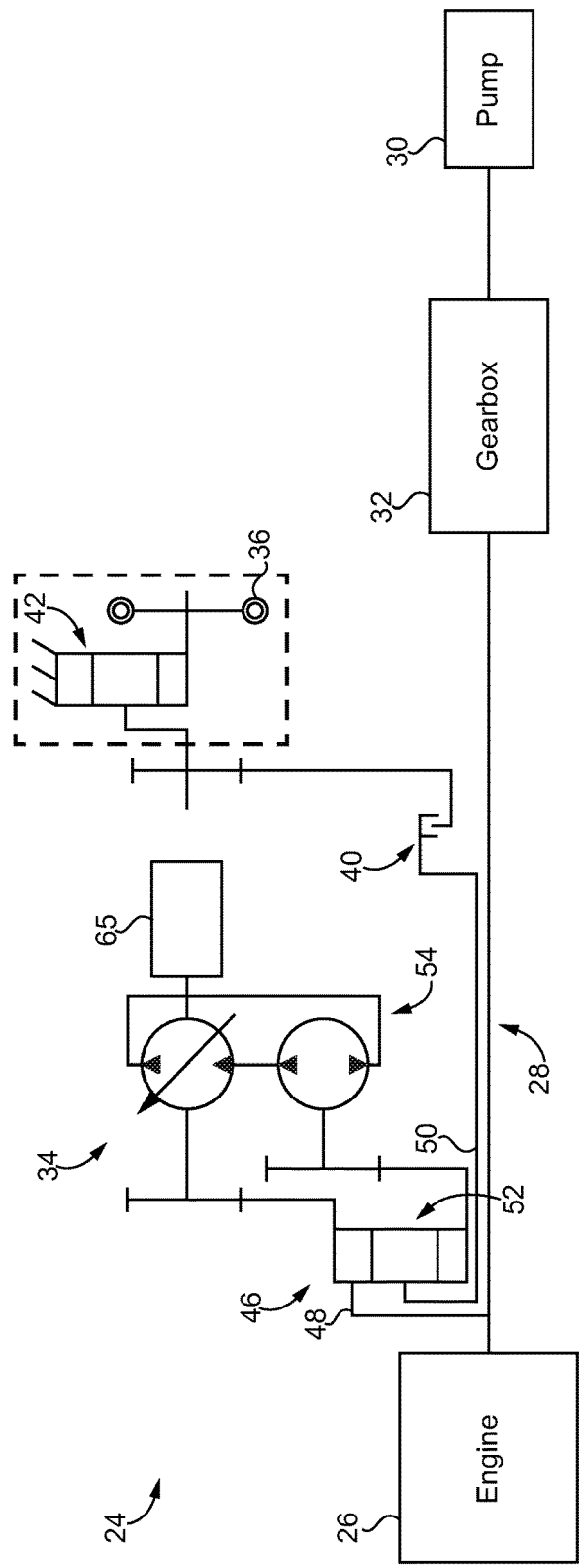
FIG. 3 is a schematic view of a power system, according to one embodiment.

Turning now to FIG. 3, there are shown additional components of power system 24 and energy storage system 34 in a schematic illustration. Variator 54 is coupled with a charge pump 65 in a generally conventional manner. Clutch 40 is shown coupled between differential geartrain 46 and flywheel 36. Speed-up geartrain 42 is shown coupled between clutch 40 and flywheel 36. In one embodiment, transfer gears (not numbered) may input torque to and receive torque from speed-up geartrain 42 and are coupled between clutch 40 and speed-up geartrain 42. In an implementation, speed-up geartrain 42 can include a planetary gearset that is structured to transfer energy to and receive energy from the one or more flywheels 36.

Differential geartrain 46 can also include a planetary gearset, and includes a rotatable input element 48 rotatable at a fixed speed ratio with and by driveshaft 28. Differential geartrain 46 also includes a rotatable output element 50 rotatable at a fixed speed ratio with and by flywheel 36. Differential geartrain 46 still further includes a rotatable speed control element 52 coupled between rotatable input element 48 and rotatable output element 50, and which may have multiple parts. Variator 54 is coupled to rotatable input element 48, and rotatable speed control element 52 in the illustrated embodiment. It is contemplated that variator 54 could be driven directly off the geartrain of engine 26, or driven directly off of driveshaft 28, or driven by differential geartrain 46. In other embodiments, variator 54 could be powered in a manner that is decoupled from rotation of engine 26 and/or driveshaft 28, such as where variator 54 includes an independently operated hydraulic variator or an electric variator, for instance.

Referring now to FIG. 4, there are shown components of energy storage system 34 in greater detail. It can be seen that variator 54 includes a hydraulic pump 76 coupled with a variator input shaft 80. Variator input shaft 80 can be fixed to rotate with engine 26 and/or driveshaft 28, and can be mechanically coupled to differential geartrain 46 in some embodiments as noted above. Variator 54 also includes a hydraulic motor 78 coupled with a variator output shaft 74. Variator input shaft 80 and variator output shaft 74 are rotatable at a range of speed ratios relative to one another. Hydraulic motor 78 can be operated in a forward direction, or a reverse direction, and at a range of speeds so as to rotate rotatable speed control element 52 at a range of speeds and vary a speed difference between rotatable input element 48 and rotatable output element 50. Variator output shaft 74 may be coupled with transfer gears 82 that could step up or step down variator shaft output speed depending upon design requirements. It is also contemplated that hydraulic motor 78 could operate in a pumping mode so as to drive pump 76 and apply a torque via variator input shaft 80 to a rotatable load if desired. In a practical implementation strategy variator 54 is fully reversible, and pump 76 could include a variable displacement swash plate-type pump, or any other suitable design.

Those skilled in the art will recognize differential geartrain 46 as a planetary gearset in the FIG. 4 illustration. Rotatable input element 48 can include or be coupled and fixed to rotate with a ring gear 66. Rotatable output element 50 can include or be coupled with a carrier 68. Rotatable speed control element 52 can include or be coupled with a sun gear 70 and a plurality of planet gears 72. Accordingly, sun gear 70 and planet gears 72 could be understood as a rotatable speed control element that can vary a speed difference between rotatable input element 48 and rotatable output element 50 and thus vary a difference between an input speed and an output speed of transmission 38. Variator input shaft 80 can be fixed to rotate with ring gear 66 as suggested above. Variator output shaft 74 can be fixed to rotate with sun gear 70. Rotatable output element 50 can also be fixed to rotate with input shaft 64 of speed-up geartrain 42 and/or flywheel 36. It will be appreciated that various other gear configurations could fall within the scope of the present disclosure, and embodiments are contemplated where rotatable input element 48 and/or rotatable output element 50 are themselves one or more gears in a more complex geartrain rather than shafts or the like as illustrated. It is also contemplated that multiple variators might be used in parallel and balanced with one another to various ends. It is nevertheless contemplated that the arrangement depicted in FIG. 4, where transmission 38 is a parallel path hydromechanical transmission with a single variator having a pump fixed to rotate with a ring gear and a motor fixed to rotate with a sun gear, provides a practical implementation strategy consistent with size, complexity, and packaging constraints.

INDUSTRIAL APPLICABILITY

Referring now to the drawings generally, during operation of engine 26 driveshaft 28 can be rotated to turn gears in gearbox 32 and apply a torque to a rotatable load such as pump 30. As noted above, the rotatable load could include a final drive in a machine drivetrain, industrial or mining equipment, or some other piece of typically heavy-duty machinery. Energy storage system 34 could be structured so that flywheel 36 is decoupled from transmission 38 by disconnecting a controllable lockup clutch or the like. It is also contemplated that variator 54 and/or other components could be controllably placed in such a state that while the mechanical connection between flywheel 36 and driveshaft 28 is not interrupted no energy is presently being transferred between flywheel 36 and driveshaft 28. It is nevertheless contemplated that much of the time, or substantially all of the time, energy storage system 34 will be operated such that energy is transferred between driveshaft 28 and energy storage flywheel 36 with the pattern of energy transfer being controllable by way of variator 54 as further discussed herein.

In general terms, if carrier 68 accelerates, flywheel 36 is accelerated and energy will flow from driveshaft 28 and rotatable input element 48 to flywheel 36. If carrier 68 decelerates, flywheel 36 decelerates and energy will flow from flywheel 36 to rotatable input element 48 and driveshaft 28. If ring gear 66 has a constant positive speed and sun gear 70 has a positive acceleration, carrier 68 will tend to accelerate. Acceleration of sun gear 70 is directly proportional to acceleration of variator output shaft 74, and speed of variator output shaft 74 is proportional to speed of variator input shaft 80, displacement of hydraulic pump 76 and displacement of hydraulic motor 78. Acceleration of variator output shaft 74 is in turn proportional to the rate of change of displacement of hydraulic pump 76. Acceleration or deceleration of flywheel 36 and thus energy flow into or out of flywheel 36 may therefore be proportional to the rate of change of displacement of hydraulic pump 76. Those skilled in the art will appreciate that incorporation of additional or alternative speed control elements such as differential gear trains and/or other changes to the architecture of power system 24 could result in different patterns or modes of energy transfer.

Ring gear 66 and rotatable input element 48 will typically continuously rotate so long as driveshaft 28 is rotating. It will thus be understood that by varying the speed of a gear such as sun gear 70 in differential geartrain 48 with variator 54, a pattern of the transfer of energy between driveshaft 28 and flywheel 36 including at least one of magnitude of energy transfer or direction of energy transfer can be changed. The varying of the speed of sun gear 70 occurs in response to varying the speed of hydraulic motor 78, which in turn is varied in response to varying a displacement of pump 76 in the illustrated configuration. A transfer of energy from the energy storage flywheel to the driveshaft or from the driveshaft to the energy storage flywheel can be initiated, increased, decreased, or interrupted, in response to the varying of the speed of the output shaft. The flexibility described herein in connection with matching speeds and controlling the magnitude and/or direction of energy transfer between flywheel 36 and driveshaft 28 is achieved with a single range transmission. It will nevertheless be appreciated that multiple ranges could be provided in a transmission configuration according to the present disclosure.

Referring now to FIG. 5, there is shown a nomogram illustrating functional and relational properties of power system 24 and energy storage system 34. In nomogram 90 reference numeral 92 indicates a speed input of ring gear 66. Line 94 represents constant speed of ring gear 66. Unless engine speed is varied, these components and ones that are directly coupled therewith will not vary. Line 98 represents the speed range of sun gear 70 as driven by variator output shaft 74 both above and below the zero speed line. Reference numeral 99 identifies a speed range of carrier 68 and generally flywheel speed, although it should be appreciated a speed-up of as much as a 15:1 ratio or even greater between carrier speed and flywheel speed might be used.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A power system for a machine comprising:
a driveshaft structured for coupling between an engine and a rotatable load;
an energy storage system including a flywheel, and a transmission structured to transfer energy between the flywheel and the driveshaft;
the transmission including a differential geartrain having a rotatable input element rotatable at a fixed speed ratio with the driveshaft, and a rotatable output element rotatable at a fixed speed ratio with the flywheel;
the differential geartrain further including a rotatable speed control element coupled between the rotatable input element and the rotatable output element; and
the transmission further including a variator having a variator input shaft, and a variator output shaft coupled to the rotatable speed control element.

2. The power system of claim 1 wherein the variator output shaft is rotatable at a range of speeds to vary a speed difference between the rotatable input element and the rotatable output element.

3. The power system of claim 1 wherein the rotatable input element includes a ring gear, the rotatable output element includes a carrier, and the rotatable speed control element includes a single rotatable speed control element having a sun gear and a plurality of planet gears coupled with the sun gear.

4. The power system of claim 3 wherein the variator includes a hydraulic variator.

5. The power system of claim 4 wherein the variator further includes an input shaft fixed to rotate with the ring gear.

6. The power system of claim 4 wherein the variator further includes a variable displacement hydraulic pump coupled with the ring gear or the driveshaft.

7. The power system of claim 1 further comprising a clutch coupled between the rotatable output element and the flywheel, and a speed-up geartrain coupled between the clutch and the flywheel.

8. A machine comprising:
a frame;
a power system coupled to the frame, and including an engine, a rotatable load, a driveshaft coupled between the engine and the rotatable load, and an energy storage system;
the energy storage system including a flywheel and a transmission, the transmission including a differential geartrain having a rotatable speed control element and being structured to transfer energy between the flywheel and the driveshaft; and
the transmission further including a variator having a variator input shaft, and a variator output shaft coupled with the rotatable speed control element and rotatable at a range of speeds relative to the variator input shaft.

9. The machine of claim 8 wherein the differential geartrain includes a ring gear fixed to rotate with the driveshaft, and a carrier fixed to rotate with the flywheel.

10. The machine of claim 9 wherein the rotatable speed control element includes a sun gear and a plurality of planet gears coupled with the sun gear in the differential geartrain, and wherein the variator output shaft is coupled to the sun gear.

11. The machine of claim 10 wherein the variator includes a hydraulic variator.

12. The machine of claim 11 wherein the hydraulic variator includes a variable displacement pump fixed to rotate with the ring gear.

13. The machine of claim 12 wherein the transmission includes a transmission housing and the differential geartrain is positioned within the transmission housing, and wherein the hydraulic variator includes a variator housing mounted upon the transmission housing.

14. The machine of claim 10 further comprising a clutch coupled between the carrier and the flywheel, and a speed-up geartrain coupled between the clutch and the flywheel.

15. A method of operating a power system in a machine comprising:
operating an engine in the power system so as to rotate a driveshaft extending between the engine and a rotatable load;
varying the speed of an output shaft of a variator in a transmission coupled with the engine so as to vary the speed of a rotatable speed control element in a differential geartrain of the transmission;
transferring energy between the driveshaft and an energy storage flywheel in the power system by way of the transmission; and
changing a pattern of the transfer of energy between the driveshaft and the energy storage flywheel in response to the varying of the speed of the output shaft of the variator.

16. The method of claim 15 wherein the varying of the speed of an output shaft of a variator includes varying the speed of an output shaft of a hydraulic motor in a hydraulic variator in response to varying a displacement of a hydraulic pump in the hydraulic variator.

17. The method of claim 16 wherein the varying of the speed of a rotatable speed control element includes varying the speed of a sun gear in the differential geartrain.

18. The method of claim 17 wherein the transferring of energy between the driveshaft and an energy storage flywheel further includes rotating a ring gear in the differential geartrain at a fixed speed ratio with the engine, and rotating a carrier in the differential geartrain at a fixed speed ratio with the flywheel.

19. The method of claim 16 wherein the changing of the pattern of the transfer of energy includes initiating or increasing a transfer of energy from the driveshaft to the energy storage flywheel in response to the varying of the speed of the output shaft.

20. The method of claim 16 wherein the changing of the pattern of the transfer of energy includes initiating or increasing a transfer of energy from the energy storage flywheel to the driveshaft in response to the varying of the speed of the output shaft.

* * * * *